June 23, 1964   G. J. E. JAYLE ETAL   3,138,334
APPARATUS AND IN PARTICULAR IN CAMPIMETERS INCLUDING
A SCREEN ILLUMINATED IN A UNIFORM MANNER
Filed Feb. 29, 1960
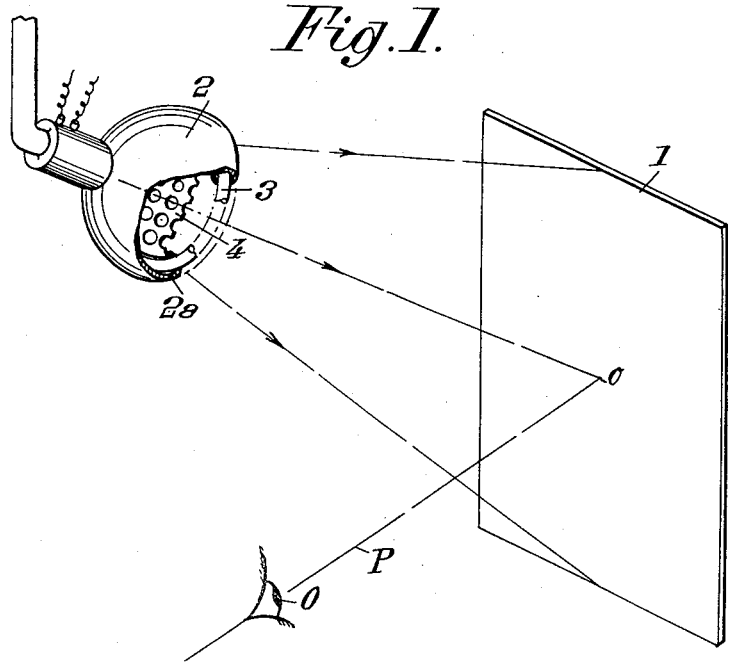
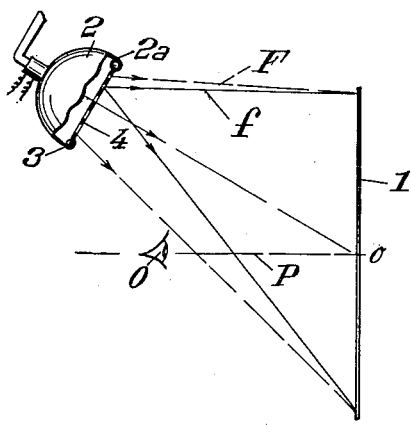
INVENTORS.
GAËTAN JEAN EDOUARD JAYLE,
PIERRE MOSSE
BY
Lawson and Taylor
ATTORNEY

United States Patent Office 3,138,334
Patented June 23, 1964

3,138,334
APPARATUS AND IN PARTICULAR IN CAMPIMETERS INCLUDING A SCREEN ILLUMINATED IN A UNIFORM MANNER
Gaëtan Jean Edouard Jayle and Pierre Mossé, both of 79 Rue du Dr. Escat, Marseille, France
Filed Feb. 29, 1960, Ser. No. 11,830
Claims priority, application France Mar. 7, 1959
1 Claim. (Cl. 240—46.45)

The present invention relates to apparatus comprising a screen to be illuminated in a uniform manner, that is to say a screen where light is to be distributed in a diffuse and homogeneous manner.

The invention is more especially but not exclusively concerned with campimeters, that is to say apparatus serving in ophtalmology to study the capacity of adaptation of the eye in various conditions of luminosity.

The chief object of the present invention is to provide an apparatus of this kind which is better adapted to meet the requirements of practice than those existing up to the present time.

According to our invention, the apparatus includes a bowl-shaped member preferably of semi-spherical shape capable of emitting, in direction of the screen, a flux of diffuse light and provided with means for distributing this diffuse light so as to achieve the desired illumination of the screen.

Other features of our invention will become apparent in the following description, with reference to the accompanying drawing, given merely by way of example, and in which:

FIG. 1 is a perspective view, with parts cut away, of an apparatus made according to our invention.

FIG. 2 is an explanatory diagram in vertical section and corresponding to FIG. 1.

The campimeter shown on FIG. 1 includes an observation screen 1 which is preferably black and has been supposed, by way of example, to be of flat shape and of quadrangular outline.

The patient is disposed in front of this screen so that his eye O is located substantially on the perpendicular P passing through the center $o$ of screen 1.

The means for illuminating this screen include a bowl-shaped member 2, preferably of hemispherical shape, having its concave surface turned toward the screen.

The edge of said bowl-shaped member 2 is bent inwardly so as to form a kind of gutter $2_a$ opening toward the inner wall of member 2, a suitable light source being housed in said gutter so as to give a substantially homogeneous illumination of the inner wall of bowl-shaped member 2. Thus, a light flux F can be transmitted from said bowl-shaped member 2 toward screen 1, without light rays from the illuminating source being allowed to travel directly toward screen 1.

The light in question may be either a circular luminescent tube 3 extending in the bottom of gutter $2_a$ as shown by the drawing or a plurality of light bulbs distributed along said gutter.

The electric wires leading to said tube or bulbs enter the bowl-shaped member from the rear part as shown by the drawing.

Advantageously, the concave wall of bowl-shaped member 2 is coated with a substance ensuring a diffuse reflection of light, such a coating being for instance a light coloured metallic paint.

In order to permit an easy observation of screen 1 by the patient's eye located at O, bowl-shaped member 2 is located laterally of the line P extending from point O perpendicularly to screen 1.

In order to obtain uniform distribution of light on screen 1, we provide across the opening of bowl-shaped member 2 a grid 4 which distributes the diffuse light from said member toward said screen.

Since the concave wall of bowl-shaped member 2 constitutes a luminous area of homogeneous brightness, the holes provided in grid 4 form a multiplicity of elementary diffuse light sources of equal brightness each of which sends an elementary light flux in all directions as shown at $f$ on FIG. 2 for one of said holes. The respective areas of the holes of grid 4 and their distribution are calculated so that the sum of the elementary fluxes received at every point of screen 1 is substantially the same for all points, whereby the illumination of said screen is uniform.

For instance, the holes of grid 4 have different dimensions and in particular, when bowl-shaped member 2 is located above point O, the holes of the grid are the smaller as they are higher in position on said grid.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claim.

What we claim is:

A campimeter comprising, in combination, a light observation screen having an imaginary perpendicular line passing through the center of the screen, the screen being observed by a patient's eye from a point on said perpendicular in front of the screen; a single bowl-shaped member of semi-spherical shape having an inner concave wall comprising a diffuse light reflecting surface turned toward the screen and symmetrical with respect to an imaginary axis oblique to the screen and intersecting the screen in the center thereof, the bowl-shaped member located laterally of the said imaginary perpendicular line and the observation point thereon; an annular light source means carried by the edge of said bowl-shaped member for homogeneously illuminating said diffuse light reflecting surface; inwardly bent, annular edge means carried by the edge of the bowl-shaped member for stopping transmission of light rays from the light source directly to the outside of said bowl-shaped member and to said screen; and a grid means covering the opening of the bowl-shaped member for distributing the homogeneous diffuse light reflected from said surface to achieve the same predetermined illumination of said screen at all points thereof, the grid means comprising a grid plate at a right angle to the imaginary oblique axis and having a multiplicity of holes of different dimensions distributed over its surface to further diffuse the reflected light, the holes having the largest dimensional area being nearest the imaginary perpendicular line and the dimensional area of the remaining holes decreasing in size as their lateral distance from said imaginary perpendicular line increases, the sum of the elementary fluxes of diffuse light passing through the holes and received at each point of said screen being the same as the sum received at all other points of the screen.

References Cited in the file of this patent

UNITED STATES PATENTS

| | | |
|---|---|---|
| 1,255,755 | Johanson | Feb. 5, 1918 |
| 2,001,378 | Cornwall | May 14, 1935 |
| 2,321,636 | Todd | June 15, 1943 |
| 2,327,818 | Peterson | Aug. 24, 1943 |
| 2,538,681 | Gangbin | Jan. 16, 1951 |
| 2,629,813 | Murphy | Feb. 24, 1953 |

FOREIGN PATENTS

| | | |
|---|---|---|
| 309,512 | Great Britain | Apr. 12, 1929 |